United States Patent [19]
Zimmerman

[11] 3,753,408
[45] Aug. 21, 1973

[54] HYDRO-DISINTEGRATOR

[76] Inventor: Neil J. Zimmerman, 3339 Brookside Drive, Malibu, Calif. 90265

[22] Filed: Sept. 16, 1971

[21] Appl. No.: 181,071

[52] U.S. Cl. ............................................. 111/7.1
[51] Int. Cl. ........................................... A01c 23/02
[58] Field of Search .......................... 111/6–7.4; 47/1.5, 1.7; 56/DIG. 5, 320.2, 320.1; 401/289, 288, 41–42; 15/24, 29

[56] References Cited
UNITED STATES PATENTS

| 3,680,504 | 8/1972 | Seebald | 111/6 |
| 1,494,739 | 5/1924 | Fisler | 401/288 |
| 1,041,011 | 10/1912 | Bryan | 401/289 |
| 663,245 | 12/1900 | Sturgis | 401/289 X |
| 1,979,541 | 11/1934 | Gunn | 111/7.1 |
| 1,991,930 | 2/1935 | Hope | 111/7.1 |
| 2,530,886 | 11/1950 | Maisel | 111/8 X |
| 2,599,911 | 6/1952 | Haines | 15/29 |
| 2,638,730 | 5/1953 | Davidson | 401/28 X |
| 2,908,444 | 10/1959 | Mullin | 56/DIG. 5 |

Primary Examiner—Robert E. Bagwill
Attorney—Edgar W. Averill, Jr. et al.

[57] ABSTRACT

A hydro-disintegrator useful for disposing of animal droppings in lawns utilizing a stream of water and fragmenting means. The device breaks up the droppings and causes them to be dispersed, absorbed or dissolved into the lawn. The stream of water may be supplied by an ordinary garden hose and means for adding a deodorant, detergent, or the like to the water stream are also disclosed.

7 Claims, 4 Drawing Figures

Patented Aug. 21, 1973
3,753,408
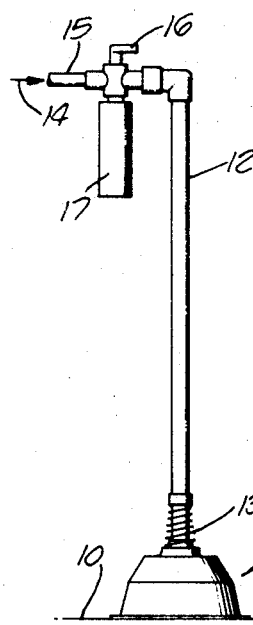
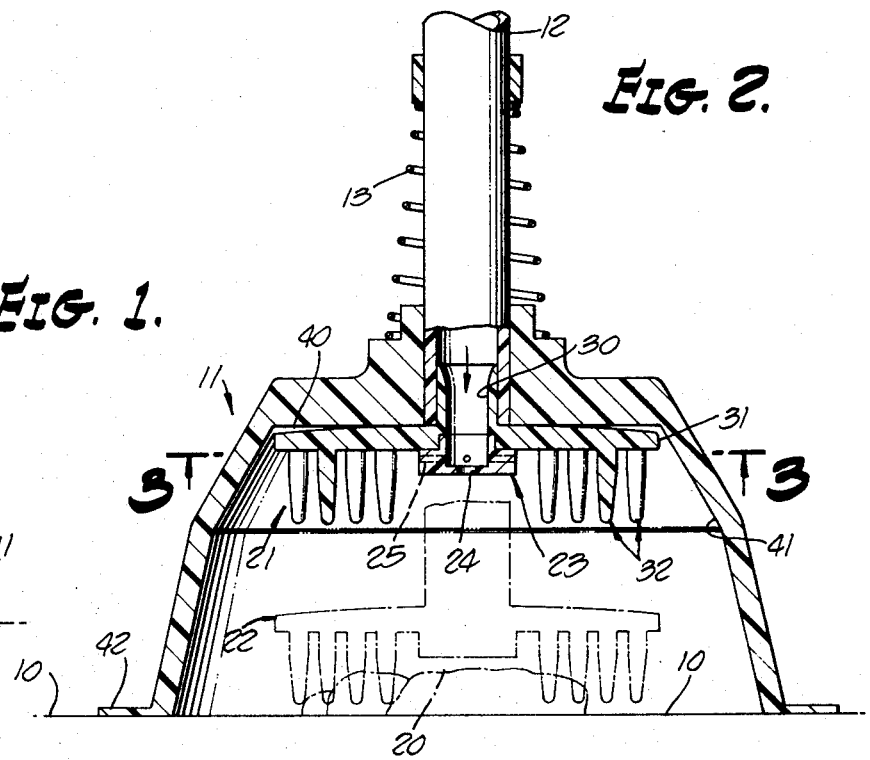
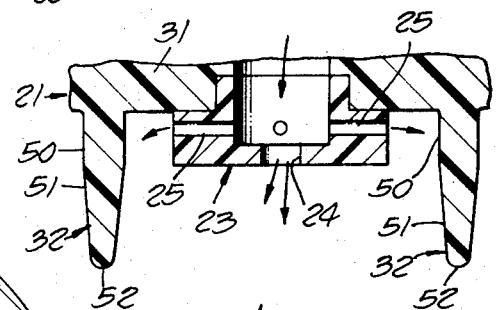
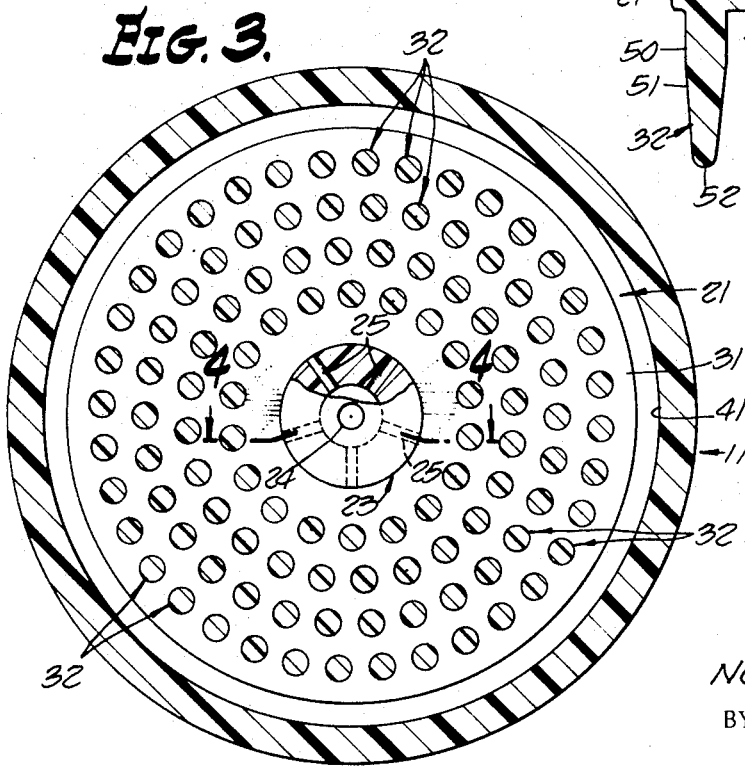
INVENTOR
NEIL J. ZIMMERMAN
BY
*Lyon & Lyon*
ATTORNEYS

HYDRO-DISINTEGRATOR

BACKGROUND OF THE INVENTION

One of the most prevalent problems for a pet owner or his neighbor arises from the necessity of disposing of the pet droppings in his lawn. Numerous means are used to accomplish this unpleasant task, but to date such means have been somewhat repugnant. With the continued increase in suburban population and also in pet population this disposal problem is one of ever increasing concern. By far the most common method used involves shovels, scoops and the like with their associated uninviting attributes.

SUMMARY OF THE INVENTION

It is thus an object of the present invention to provide a device for disposing of animal droppings on lawns or on other porous media.

It is another object of the present invention to provide a method for disposing of animal droppings which method minimizes or eliminates distasteful odors and handling of the droppings.

These and other objects of the invention are accomplished by provision of a device which utilizes a shield having a water impervious top and sides which may be disposed over the dropping. The device is then capable of directing a stream of water into the interior of the shield and against the dropping. At the same time the device is provided with means for fragmenting or physically breaking up the dropping to further cause its disintegration and dispersion into a lawn, turf, or other porous medium. In a preferred embodiment of the present invention a deodorant or odorant may be added to the stream of water to minimize or eliminate unpleasant odors. Still further a detergent may be added to the stream of water to further facilitate the breaking up, dissolving and dispersing of the droppings into the lawn. A particularly effective device results from the use of a fragmentor which is made from a series of downwardly pointing protrusions which is combined with a stream of water which is directed both downwardly and horizontally against the protrusions. In this way, the fragmentor protrusions are self-cleaning and the device itself is maintained in an odor-free condition with a maximum of cleanliness. The device is preferably equipped with a shaft to enable it to be manipulated from a standing position by the operator and the shaft may be attached to the fragmenting device so that it may be readily oscillated by the movement of the shaft.

BRIEF DESCRIPTION OF THE DRAWINGS

FIG. 1 is a side elevation of the hydro-disintegrator of the present invention.

FIG. 2 is an enlarged cross-sectional view of the shield and fragmenting means of the device of FIG. 1.

FIG. 3 is a view taken along line 3—3 of FIG. 2.

FIG. 4 is an enlarged cross-sectional view taken along line 4—4 of FIG. 3.

DESCRIPTION OF THE PREFERRED EMBODIMENT

Turning now to FIG. 1, there is shown an embodiment of a hydro-disintegrator of the present invention which is disposed above a lawn 10. A shield 11 is located at the base of the device and shield 11 is attached to a shaft 12 in a manner which permits the vertical movement of shaft 12 with respect to shield 11. A spring 13 urges the shaft upwardly with respect to shield 11. A source of water 14 is introduced into arm 15 which leads into mixing and control valve 16. Valve 16 functions both as an on-off valve to control the flow of water and also is capable of mixing a predetermined amount of detergent into the water stream. The detergent is stored in detergent bottle 17. Since the construction of the mixing and control valve 16 does not form a portion of the present invention it will not be described in detail herein. Such valves are commercially available and are known to those skilled in that art.

The operation of the device is shown more clearly in FIG. 2 where shield 11 is shown disposed over animal dropping 20. Shaft 12 is a hollow pipe such as a poly vinyl chloride pipe which serves both as a water conduit and as a shaft to operate the fragmenting means. The fragmenting means is shown in FIG. 2 in its upper position and indicated by the reference character 21 and in phantom lines in its downwardmost position indicated by reference character 22. The water enters the interior of the shield through a nozzle 23 which serves as a means for directing the stream of water. Nozzle 23 has a downwardly pointing cylindrically shaped opening 24 which is shown more clearly in FIG. 4. It has a plurality of horizontally aligned cylindrical openings 25 which are shown more clearly in FIG. 3. These openings 25 serve to keep the fragmenting means 21 clean. Downwardly directed opening 24 serves to break up, disperse and dissolve the droppings 20.

Fragmenting means 21 is attached to shaft 12 through a hollow cylindrical upwardly-protruding tube 30 which fits within the interior of shaft 12. Integrally connected to tube 30 is plate 31 which forms the base for a plurality of downwardly directed pins 32. Pins 32 may be integrally molded from the same material as plate 31 which may be fabricated from a metal or from a plastic such as polyethylene, polypropylene, polyvinyl chloride or the like.

As shown in FIG. 3, pins 32 are disposed with their centers on four concentric circles about the center of plate 31. The positioner of the pins should be such that they will be cleaned by the generally horizontal stream of water which is emitted from openings 25. It has been found that the configuration shown in the drawings is a particularly effective one which combines five openings 25 in the nozzle with four concentric rings of pins on the fragmenting means. Other configurations are, of course, possible but it is desirable that the furthest row of pins be contacted by the water which is passed through opening 25 so that they will be cleaned thereby.

The shield 11 forms an important part of the present invention. In this way, the water may be turned on while the device is carried by the operator without splashing the operator. Furthermore, the shield 11 helps to direct any water which strikes it downwardly thus helping to disperse and disintegrate the droppings. Still further, the shield cooperates with the shaft 12 and spring 13 to limit the downward travelling of the fragmenting means 21. Note that the size and mounting position of spring 13 can be chosen so that it will be fully compressed at a point before the lower tip of pins 32 strikes the surface of lawn 10 thereby preventing any unnecessary damage to the lawn. This downward travel may alternatively be limited by a collar located on shaft 12 which would contact shield 11.

The interior of shield 11 has a top 40 which abuts against plate 31 when plate 31 is in its uppermost position. The interior of shield 11 also has a deflecting surface 41 which is shown in the drawings as a frusto-conical surface. By the provision of deflecting surface 41 the stream of water which sprays from openings 25 in a horizontal direction and reaches the shield is more readily deflected downwardly as the device is carried by the operator. Shield 11 is also provided with a base 42 which rests against lawn 10. Base 42 helps prevent any undesirable penetration of shield 11 into lawn 10.

A particular effective pin shape is shown best in FIG. 4 where pin 32 has an upper cylindrical portion 50, an intermediate frusto-conical portion 51 and a lower hemispherical portion 52. Such pins are readily cleaned by the water spray and also have been found effective in performing the fragmenting function.

A hydro-disintegrator of the type shown in the drawings was fabricated utilizing a shaft made from schedule 40 ½ inches polyvinyl chloride pipe having a polyethylene shield and a polyethylene fragmenting means. The fragmenting means had pins one-half inch long having a cylindrical portion with a diameter of three-sixteenths inch which terminated in a frusto-conical portion at a point one-fourth inch from the intersection of the pin and its supporting plate. The frusto-conical portion terminates in a hemispherical point. The device had an overall height of 30½ inches and the shield had an inside diameter of 6⅝ inches. The outside diameter of the base was 7¾ inches and the diameter at the lower extremity of the deflecting surface 41 was 5¾ inches. The vertical movement of the fragmenting means was about 2 inches.

The nozzle had a center, downwardly-pointing opening having a diameter of three-sixteenths inch and five equally spaced horizontal openings having a diameter of five sixty-fourths inch. When the fragmenting means was in its lowest position the lower extremity of the pins remained one-eighth inch above the ground level. The pins were located as shown in FIG. 3.

Various agents or odorants may be added to the stream of water. By the term "odorants" it is intended to include additives which effect a decrease in residual odor by any means such as adding a masking odor, a detergent which would aid in the dispersion of the dropping, a germicide or the like. It has been found that quaternary ammonium compounds are particularly effective in breaking up the droppings while at the same time not harming the lawn. These quaternary ammonium compounds perform a disinfecting function also. Various deodorants and odorants well known to those skilled in the art may also be added. The device may furthermore be used without any additive although the use of an additive is preferred. The device is most readily used by connecting it to a garden hose but a separate source of water or other liquid could be used in place of a garden hose. While the fragmenting means has been shown as a plurality of pins, other shapes may also be used. For instance, a corrugated plate or screen shaped fragmenting means or even a simple flat plate would aid in the breaking up and disintegrating which is carried out in the main by the water streams. While the stream of water is shown passing through the shaft of the device in the drawings this water stream need not do so. The stream could instead be directed from the shield itself or from various points within the shield. Furthermore, streams of water could be directed both through a central shaft and from the shield in order to further enhance the cleaning and disintegrating functions of the water streams.

While the nozzle shown utilizes generally horizontal openings combined with a single downward opening other shapes may also be used. It is only necessary that the water streams be directed either by passage through a nozzle or by other deflecting means in a manner to impinge both against the fragmenting means and the animal droppings. While the device of the present invention has been described largely for use on lawns, it is also useful on other porous media such as gravel, wood shavings or the like.

While particular embodiments of the present invention have been shown and described, changes and modifications may be made without departing from the invention in its broader aspects and, therefore, the aim in the appended claims is to cover all such changes and modifications as fall within the true spirit and scope of this invention.

What is claimed is:

1. A device for disposing of animal droppings comprising a shield means having a continuous, water impervious sidewall and an open bottom, a hollow shaft projecting through the top of and generally centrally of said shield means, said shaft being freely reciprocable within said shield means, a fragmenting means attached to the lower end of said shaft, comprising a nozzle and a plurality of pegs disposed therearound, said nozzle having openings at least some of which are adapted to flow liquid into said pegs, spring means interconnecting said shaft and shield means and urging said shaft away from the interior of said shield means.

2. A device as in claim 1 further including means attached to said shaft to supply liquid thereto.

3. A device as in claim 2 further including means attached thereto for supplying an odorant to said liquid supply means.

4. A device as in claim 3, wherein said odorant supply means comprises a container with a water soluble ammonium compound therein.

5. The device of claim 1 wherein said nozzle has a plurality of horizontally disposed openings and at least one vertically directed opening.

6. The device of claim 5 wherein said nozzle has five horizontally disposed openings and one downwardly disposed opening.

7. The device of claim 1 wherein said pegs are disposed in concentric circles about the center of said fragmenting means.

* * * * *